United States Patent
Fukawa

(10) Patent No.: US 7,529,003 B2
(45) Date of Patent: May 5, 2009

(54) IMAGE SCANNING DEVICE AND ITS CONTROL METHOD

(75) Inventor: Kimihiko Fukawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 11/049,966

(22) Filed: Feb. 4, 2005

(65) Prior Publication Data
US 2005/0174610 A1    Aug. 11, 2005

(30) Foreign Application Priority Data
Feb. 6, 2004  (JP) ............................. 2004-031404
Feb. 6, 2004  (JP) ............................. 2004-031405

(51) Int. Cl.
*H04N 1/46* (2006.01)

(52) U.S. Cl. ................... 358/505; 358/509; 358/520

(58) Field of Classification Search ........... 358/505, 358/509, 512, 513, 520, 530, 474, 475, 479, 358/480; 399/4; 355/37, 67, 70
See application file for complete search history.

(56) References Cited

U.S. PATENT DOCUMENTS

| | | | |
|---|---|---|---|
| 5,753,906 A | 5/1998 | Gennetten | 250/226 |
| 6,459,512 B1 | 10/2002 | Kawahara et al. | 358/515 |
| 6,469,746 B1 * | 10/2002 | Maida | 348/564 |
| 6,660,463 B2 | 12/2003 | Noguchi et al. | 430/503 |
| 6,806,041 B2 | 10/2004 | Noguchi et al. | 430/362 |
| 7,046,279 B2 * | 5/2006 | Yamanaka et al. | 348/229.1 |
| 7,411,623 B2 * | 8/2008 | Shibutani | 348/333.02 |
| 2003/0107593 A1 * | 6/2003 | Domenico | 345/752 |
| 2003/0202222 A1 | 10/2003 | Amimoto et al. | 358/474 |
| 2003/0202225 A1 | 10/2003 | Fukawa et al. | 358/506 |
| 2004/0169742 A1 * | 9/2004 | Shibutani et al. | 348/231.5 |
| 2005/0275908 A1 | 12/2005 | Nogami et al. | 358/497 |
| 2006/0012808 A1 | 1/2006 | Mizukura et al. | 358/1.9 |
| 2006/0013481 A1 * | 1/2006 | Park et al. | 382/170 |

FOREIGN PATENT DOCUMENTS

| | | | |
|---|---|---|---|
| JP | 363028694 A * | 2/1988 | |
| JP | 411065214 A * | 3/1999 | |
| JP | 2001-016598 | 1/2001 | |
| JP | 2003-84402 | 3/2003 | |
| JP | 2003-284084 | 10/2003 | |
| JP | 2003-315931 | 11/2003 | |
| JP | 2004-7547 | 1/2004 | |

* cited by examiner

*Primary Examiner*—Jerome Grant, II
(74) *Attorney, Agent, or Firm*—Fitzpatrick, Cella, Harper & Scinto

(57) ABSTRACT

This invention provides a technique which allows more faithful color reproduction by a relative simple arrangement. To this end, according to this invention, by time-divisionally driving R, G, B, and E LEDs respectively having dominant emission wavelengths of 630 nm, 525 nm, 470 nm, and 500 nm, a common monochrome line image sensor (102) scans a document image. Scanned image data of respective color components undergo correction equivalent to that attained by shifting the barycentric positions of respective wavelength distributions so as to become closer to the CIE-RGB sensitivity distributions.

12 Claims, 17 Drawing Sheets

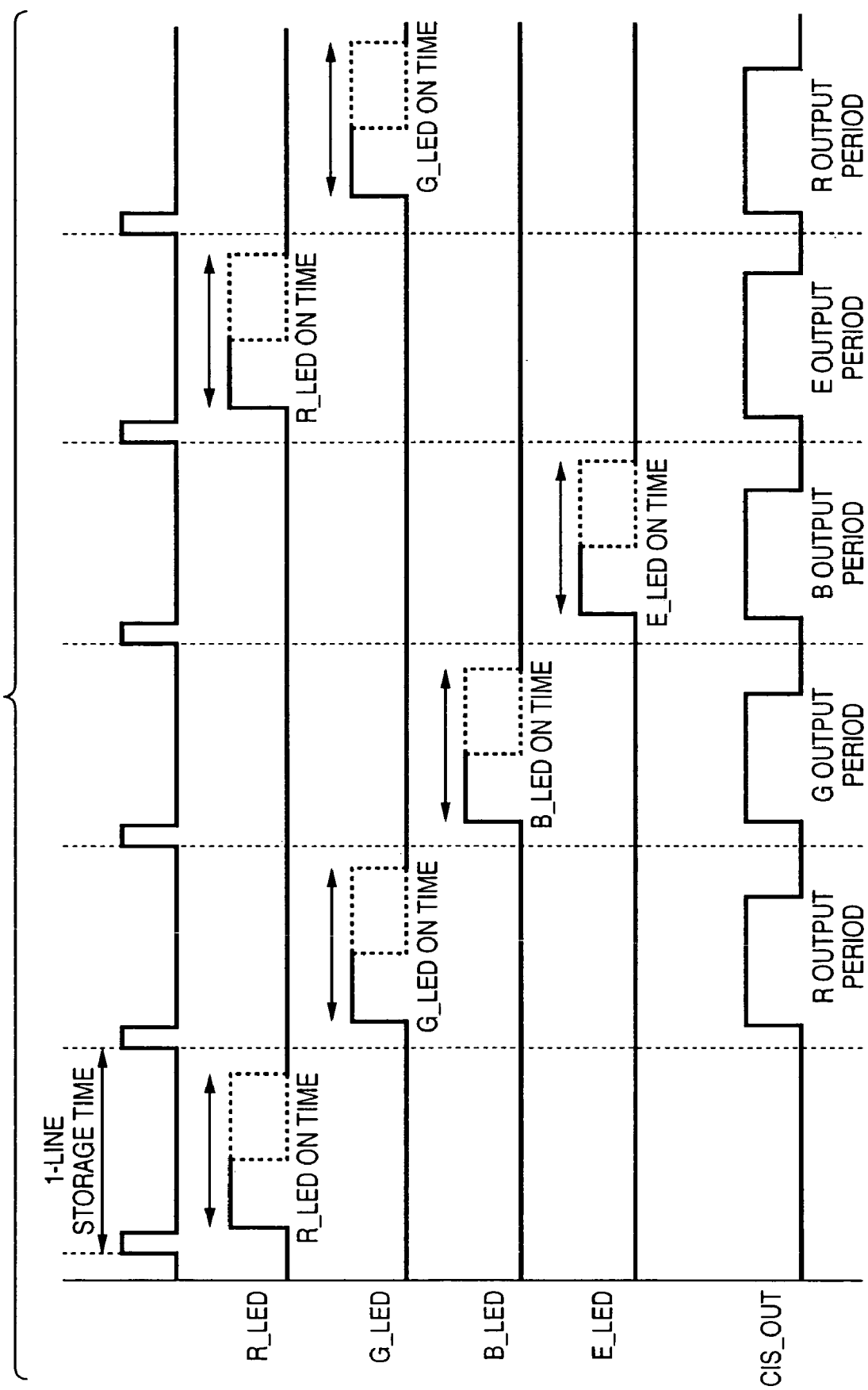

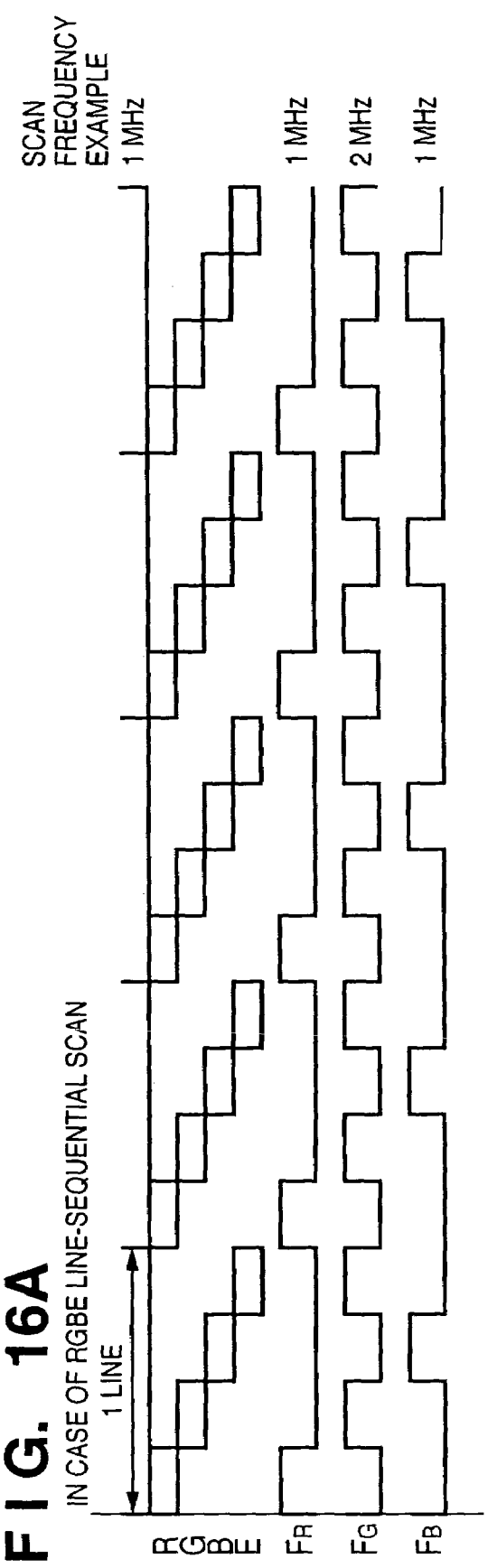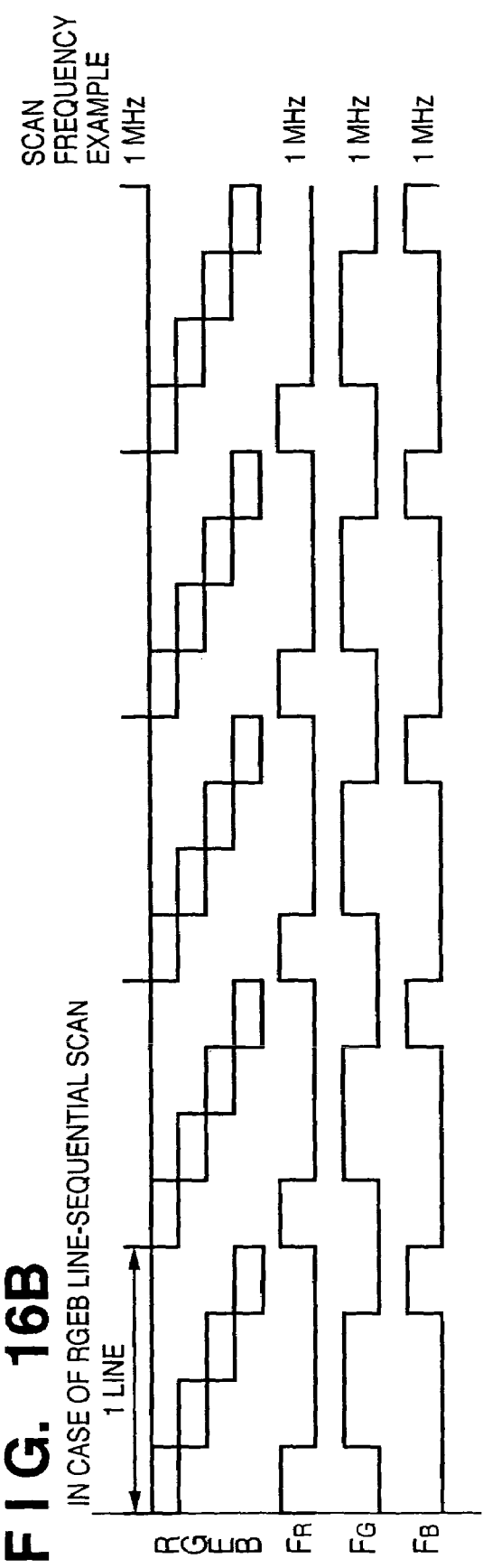

IMAGE SCANNING DEVICE AND ITS CONTROL METHOD

FIELD OF THE INVENTION

The present invention relates to a technique for scanning a document image, and outputting it as a digital image signal.

BACKGROUND OF THE INVENTION

Normally, an image scanning device represented by a color image scanner and the like has light sources (e.g., LEDs) with emission wavelength characteristics of red (R), green (G), and blue (B), and scans information from a document using a common monochrome line image sensor while switching the ON/OFF states of them, and obtains two-dimensional image information while moving the monochrome line image sensor or document in a direction perpendicular to the arrangement direction of detection elements of the monochrome line image sensor (normally called a sub-scan direction) (e.g., Japanese Patent Laid-Open No. 2003-315931).

The luminous spectrum characteristics of the LEDs of respective colors as R, G, and B light sources used in the image scanning device are approximately as shown in FIG. 3.

On the other hand, the luminousity characteristics of human eyes have spectral sensitivity characteristics different from the emission wavelength characteristics of the LEDs, as shown in the CIE-RGB calorimetric system color matching functions shown in FIG. 4.

In order to compensate for these differences, the scanned image data undergoes color correction processes to improve color reproducibility of the scanned image. However, high color reproducibility has not been obtained yet.

Especially, an image scanning device using only R, G, and B light-emitting members cannot express a negative stimulus value of a red component which appears near a wavelength of 500 nm in the CIE-RGB colorimetric system color matching functions. Hence, the color reproducibility of an emerald system is prone to be poor.

In order to express a color that cannot be expressed by the scanning means using only R, G, and B primary colors, a method of extracting a color different from R, G, and B is known (Japanese Patent Laid-Open No. 2003-284084). This method is applied to a two-dimensional image sensor adopted in a digital camera, and detects one pixel by a plurality of types of extraction units which are limited to the wavelength ranges of R, G, and B and emerald color in place of switching light source colors so as to obtain color information from an object.

However, according to the technique of this reference, since data for one pixel is extracted by extraction units of independent colors, the light-receiving area of each extraction unit becomes too small to obtain a sufficient light-receiving amount. This imposes an influence on the S/N ratio. In addition, higher cost is required to manufacture such image sensing element, and it is difficult to apply this method to the image scanning device.

SUMMARY OF THE INVENTION

The present invention has been made in consideration of the above problems, and has as its object to provide a technique which can achieve more faithful color reproduction by a relative simple arrangement.

In order to solve the above problems, an image scanning device of the present invention comprises the following arrangement.

That is, there is provided an image scanning device comprising:

an illumination unit for illuminating a document while selectively turning on visible light beams of at least four colors in turn;

an image scanning unit for scanning the document image illuminated by the illumination unit and outputting image data of respective colors;

a moving unit for relatively moving the document image and the image scanning unit; and a control unit for, when the image scanning unit executes scan processes of the document image for respective colors while performing relative movement by the moving unit, controlling not to successively execute the scan process of a first color having highest spectral luminous efficacy among the visible light beams of at least four colors and the scan process of a second color having second highest spectral luminous efficacy.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a timing chart upon scanning of the image scanning device of the first embodiment;

FIGS. 16A and 16B respectively show a case wherein E and G components are successively scanned, and a case wherein E and G components are scanned every other colors.

DETAILED DESCRIPTION OF THE PREFERRED EMBODIMENTS

Preferred embodiments of the present invention will be described in detail hereinafter with reference to the accompanying drawings. Note that LEDs as R, G, and B light sources in embodiments respectively have dominant emission wavelengths of 630 nm (R LED), 525 nm (G LED), and 470 nm (B LED). These characteristics are not special but general LED characteristics.

Figure 4:
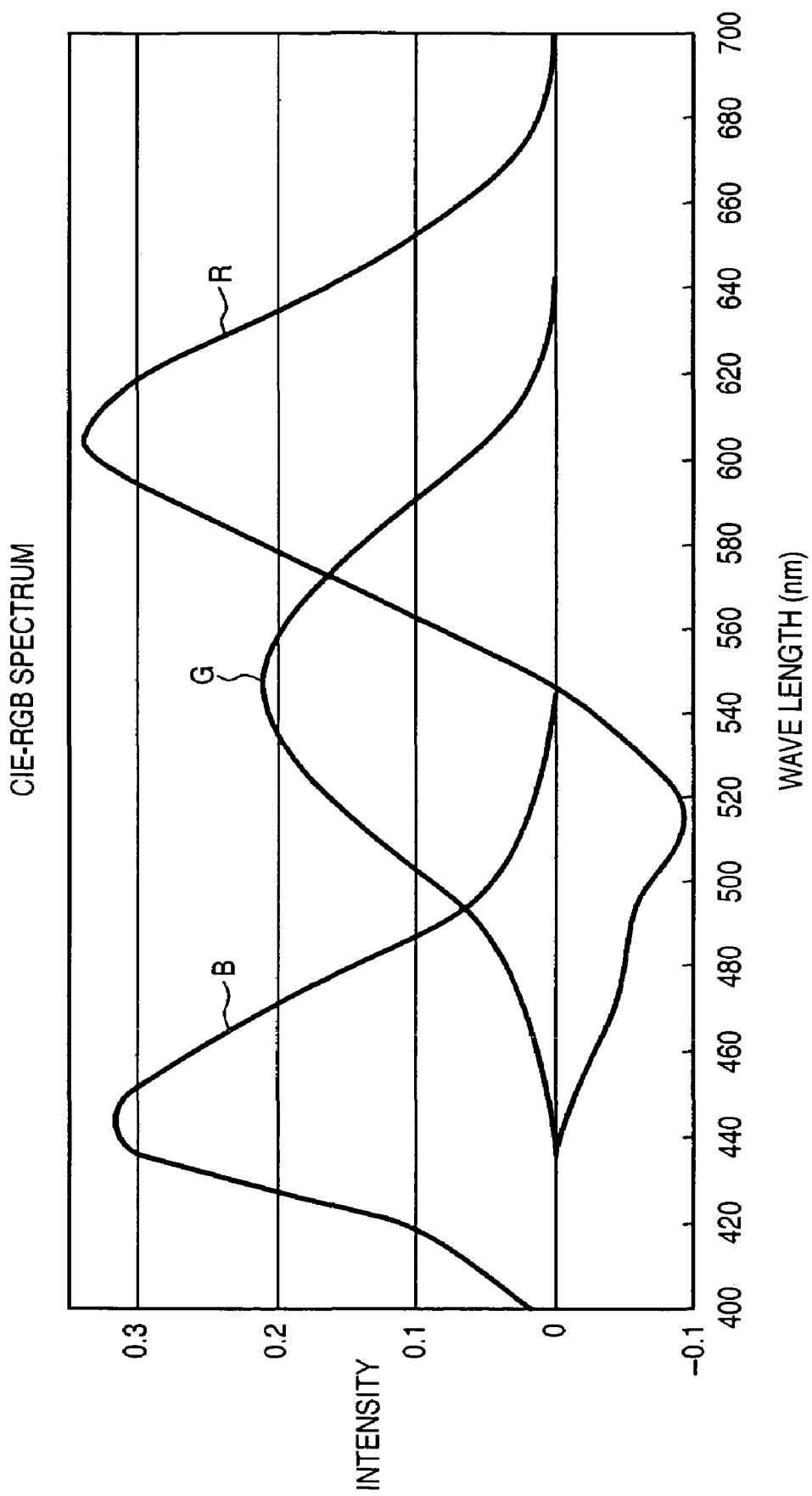
FIG. 4 shows the CIE-RGB colorimetric system color matching functions.
Figure 12:
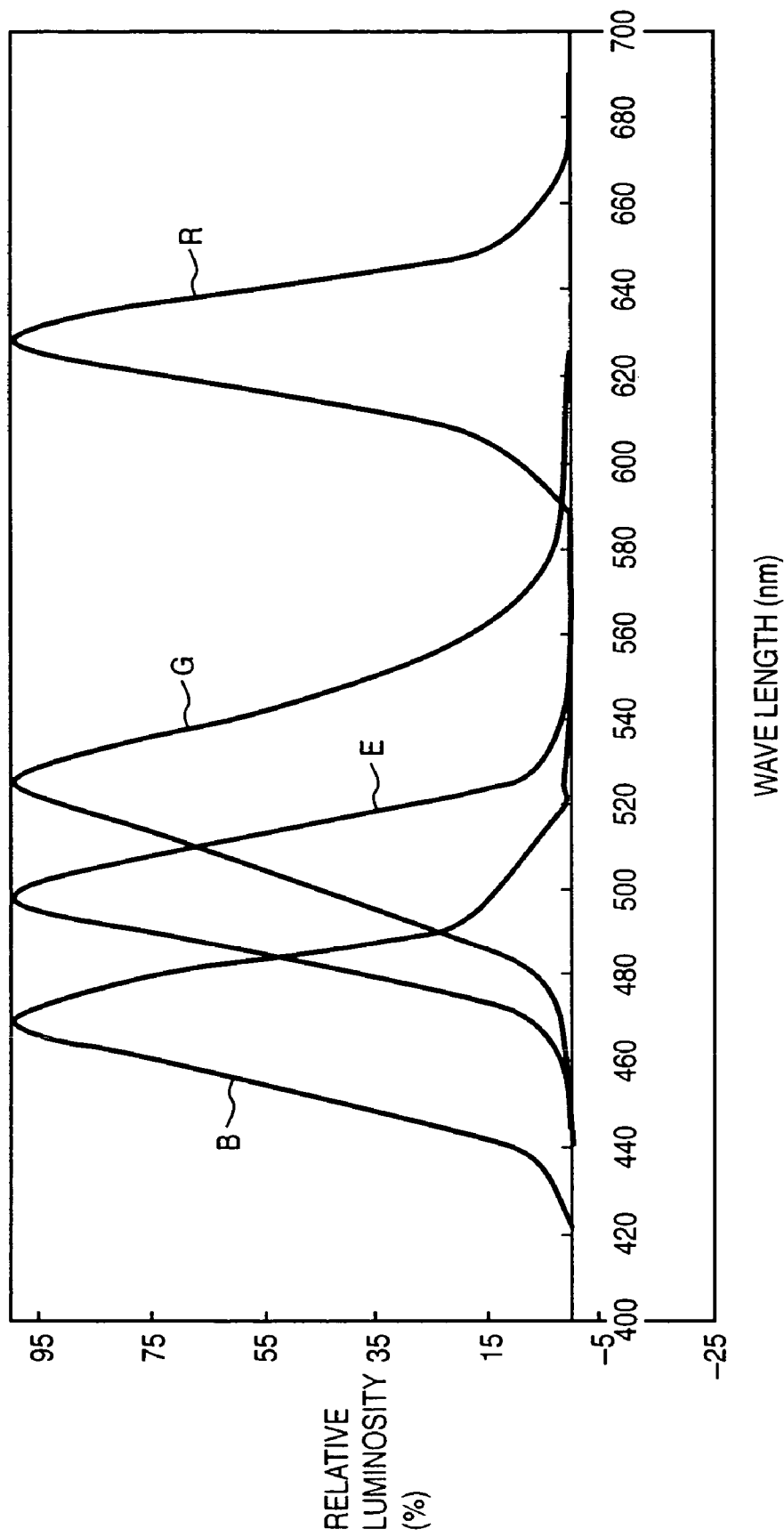
FIG. 12 shows the luminous spectrum characteristics of R, G, B, and E LEDs in the second embodiment.

In the arrangement using such R, G, and B LEDs, some colors are difficult to express. Especially, the CIE-RGB colorimetric system color matching functions include a negative stimulus value of a red component which appears near a wavelength of 500 nm, as shown in FIG. 4, and it is difficult to express this color by three colors, i.e., R, G, and B. Hence, this embodiment will exemplify a case wherein an emerald LED which has a dominant emission wavelength near 500 nm is arranged. The luminous spectrum characteristics of the four-color LEDs (R, G, B, and E) in this embodiment are as shown in FIG. 12.

First Embodiment

Figure 1:
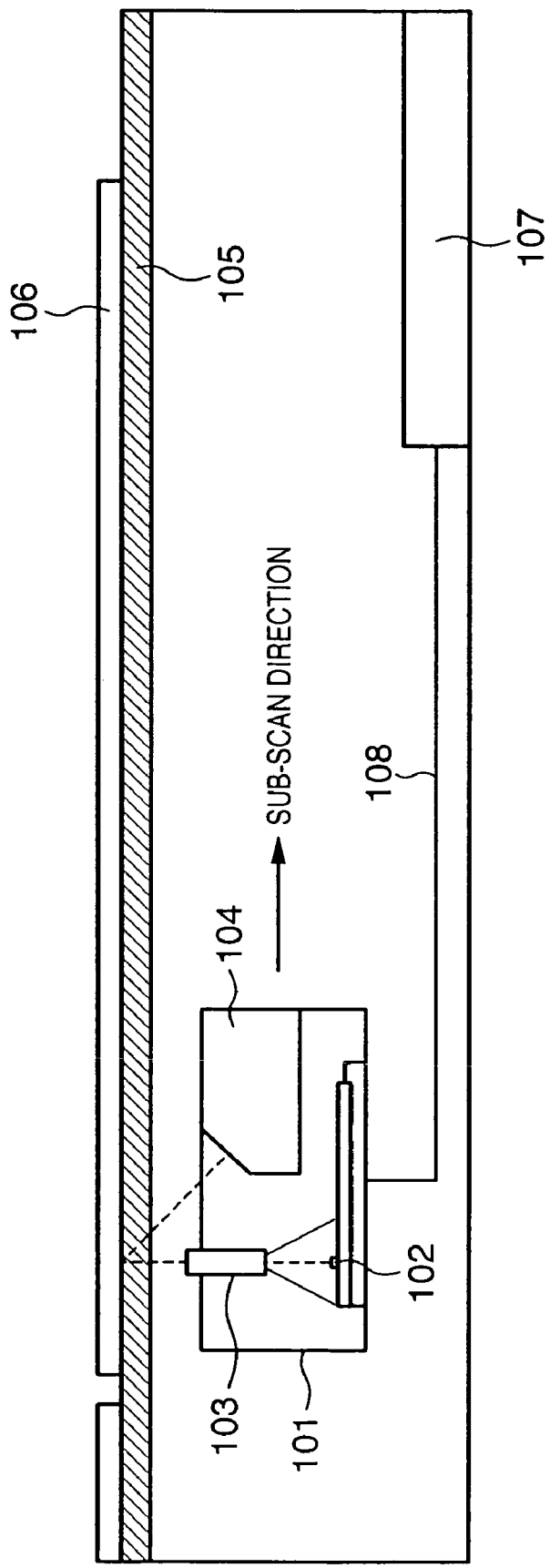
FIG. 1 is a schematic sectional view of an image scanning device according to an embodiment of the present invention.

FIG. 1 is a schematic sectional view of a document scanning device (image scanner) of this embodiment.

Referring to FIG. 1, reference numeral 101 denotes a contact image sensor unit (to be abbreviated as CIS hereinafter). Reference numeral 104 denotes an optical waveguide light source in which a red LED (R-LED), green LED (G-LED), blue LED (B-LED), and an emerald LED (emerald color will be referred to as E color hereinafter, and the emerald LED will be referred to as E-LED hereinafter) are arranged at the end portion of the waveguide which is elongated in a direction perpendicular to the plane of page (main scan direction), and which guides light emitted by each LED in the main scan direction by internal reflection to linearly irradiate a document 106 to be scanned on a document table glass (platen glass) 105 with that light.

Light reflected by the document surface is received by a monochrome image sensor 102 via a lens array 103. Light-receiving elements of the monochrome image sensor line up in the main scan direction. In the optical waveguide light source 104, the R-LED is driven to emit light, and that light is received by the monochrome image sensor 102, thus scanning R component data for one line. Then, the G, B, and E LEDs are time-divisionally driven to emit light, thus scanning G, B, and E data for one line. The same process is repeated by moving the CIS 101 along a guide (not shown) in the sub-scan direction at a constant speed by the reciprocal number of the scan resolution in the sub-scan direction in synchronism with the time (line scan time) required to scan four colors, thereby obtaining two-dimensional image data.

Reference numeral 107 denotes an electronic circuit board which is arranged in the image scanning device, and mounts circuits to be described later. The circuit board 107 is electrically connected to the CIS 101 via a flexible cable 108.

Figure 7:
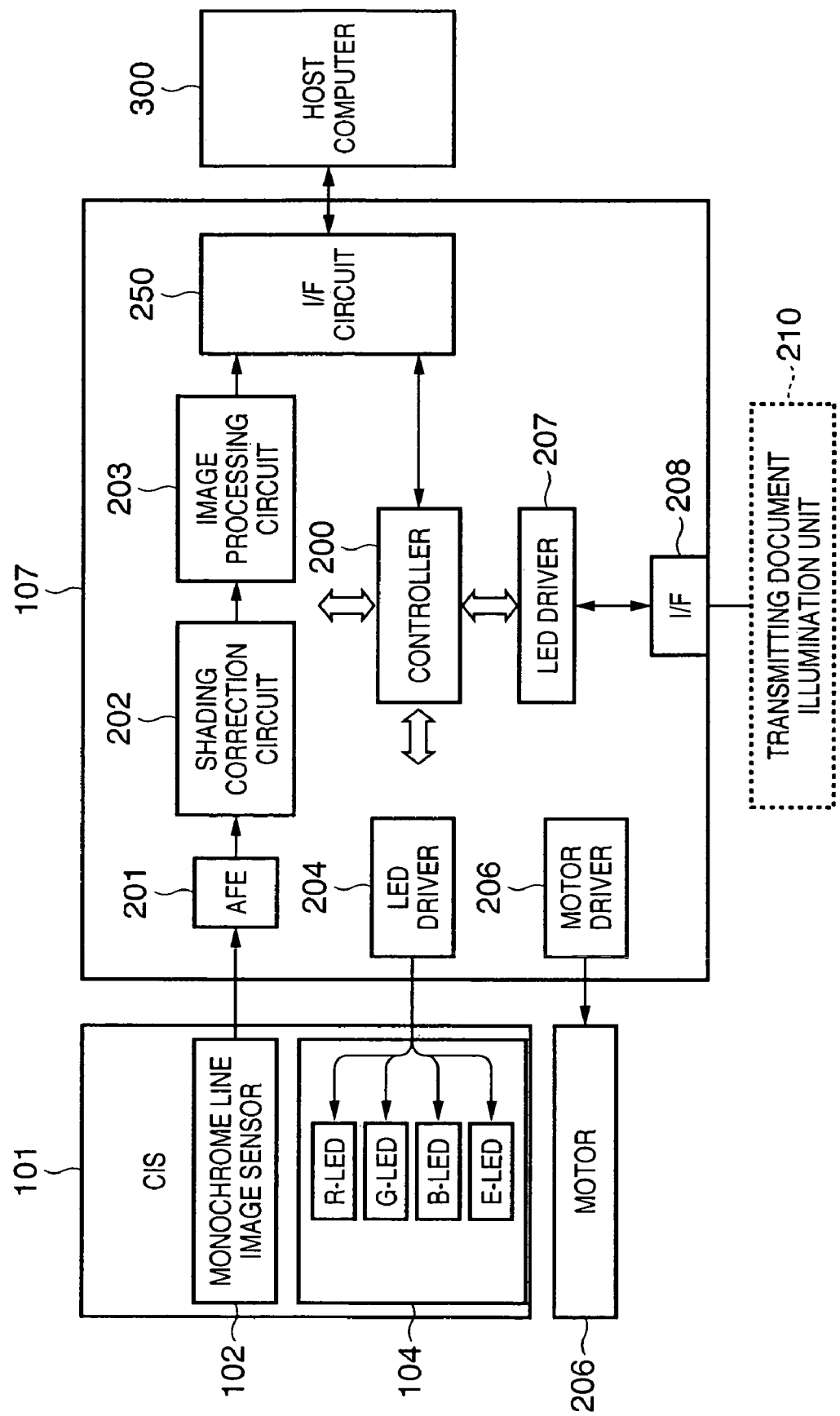
FIG. 7 is a block diagram of an image scanning device of the first embodiment.

FIG. 7 is a block diagram when viewed from the electrical system of the image scanning device of this embodiment. The same reference numerals in FIG. 7 denote the same parts as in FIG. 1.

Referring to FIG. 7, reference numeral 200 denotes a controller for controlling the overall device. The controller 200 also makes control that pertains to communications with an external host computer 300.

An analog electrical signal photoelectrically converted by the CIS 101 is converted into a digital electrical signal by an AFE circuit 201 including a sample/hold circuit such as CDS (correlative double sampling circuit) and the like after it undergoes gain adjustment and DC offset adjustment. A shading correction circuit 202 corrects the light distribution characteristics of an optical system. That is, the shading correction circuit 202 stores, as shading correction data, reference level data which is generated by scanning light reflected by a white reference plate (not shown) arranged outside the scan document range by the CIS 101, and performs shading correction of image data generated by scanning the document to be scanned on the basis of this correction data. Note that the shading correction data may be output to and saved by the host computer 300 as an external apparatus, and data required for scan may be downloaded from the host computer 300 to the image scanning device upon executing processes.

An image processing circuit 203 performs predetermined processes of image data such as a gamma conversion process, a packing process according to an image scan mode (binary, 24-bit multi-valued, and the like) which is set in advance by the host computer 300, and the like. When "binary" is set as the scan mode, a document image is scanned by driving only the G-LED, and the image processing circuit 203 binarizes and outputs the scanned data. When "32-bit multi-valued" is designated, four R, G, B, and E LEDs are sequentially driven to perform image processes (to be described later) for respective lines, i.e., in the order of 1-line data of an R component, 1-line data of a G component, 1-line data of a B component, and 1-line data of an E component to have a pixel of each of R, G, B, and E components as 8-bit data, and the processed data is output to the host computer 300.

An interface circuit 250 exchanges control signals and outputs an image signal with the host computer 300 such as a personal computer or the like. In this embodiment, the interface circuit 250 comprises a USB interface circuit. However, a SCSI interface circuit may be used. That is, the present invention is not limited in terms of the types of interfaces.

An LED driver 204 outputs drive signals of the four, i.e., R, G, B, and E LEDs included in the optical waveguide 104 in the CIS 101 under the control of the controller 200. A motor driver 205 generates a drive signal to a motor 206 which moves the CIS in the sub-scan direction.

Reference numeral 207 also denotes an LED driver which is used to turn on a transmitting document illumination unit 210 (including a light source) which is connected via an interface 208 to scan a transmitting document such as a positive/negative film or the like.

Figure 2:
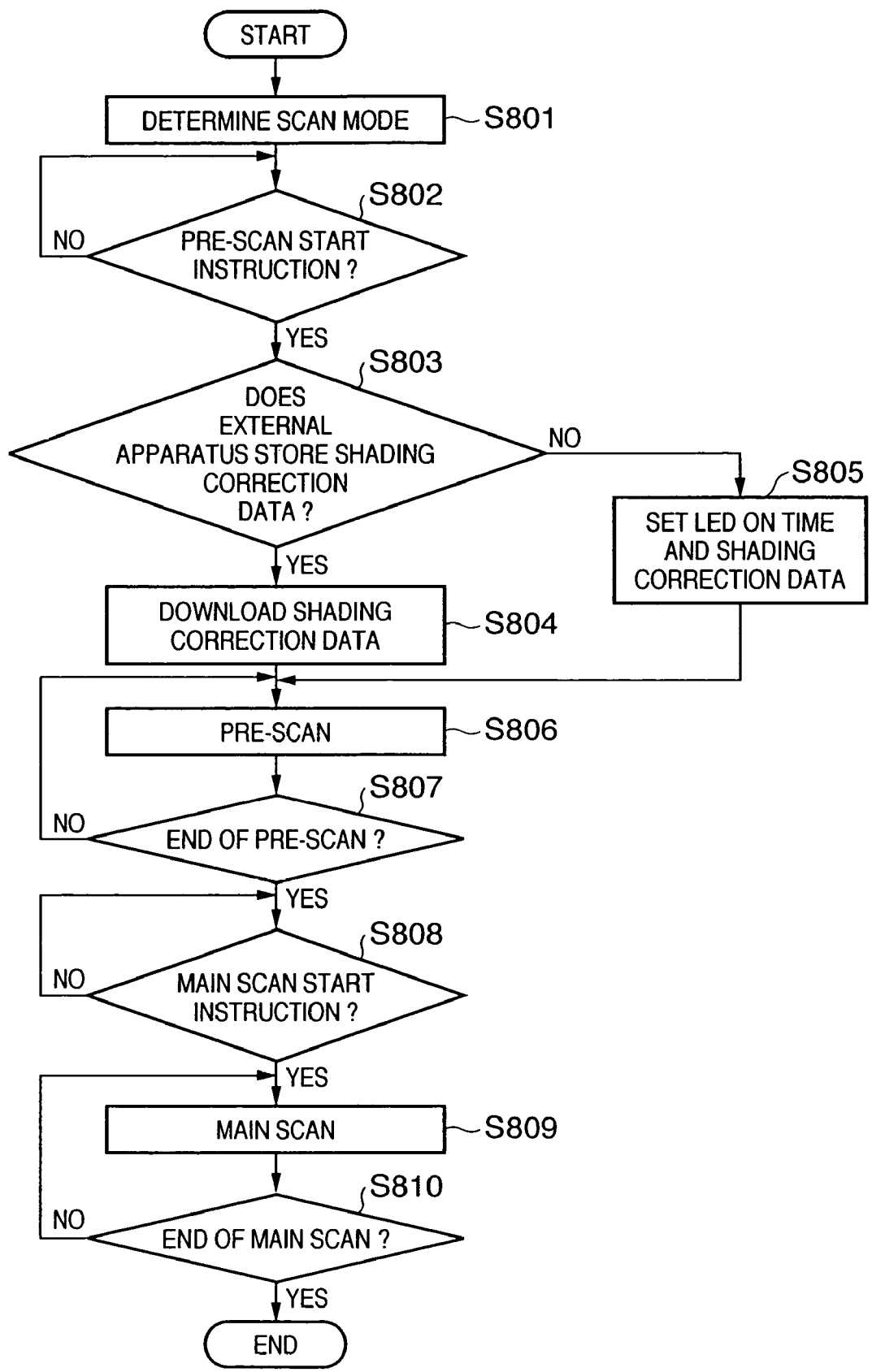
FIG. 2 is a flowchart showing the processing sequence of the image scanning device according to the embodiment of the present invention.

The process of the image scanning device of this embodiment will be described below with reference to the flowchart of FIG. 2. Note that a program associated with FIG. 2 is stored in a ROM (not shown) in the controller 200.

Upon completion of initialization after power ON, the control waits for the scan mode designated by the host computer 300 as an external apparatus (strictly speaking, a scanner driver which is running on the host computer 300). The scan mode includes a binary mode (scan mode by only the G-LED), a 24-bit multi-valued mode (scan mode using three, i.e., R, G, and B LEDs), and a 32-bit multi-valued mode (scan mode using four, i.e., R, G, B, and E LEDs). Upon reception of a designation command of one of these modes, setups are made accordingly (step S801).

In step S802, the control waits for reception of a pre-scan start instruction. Upon reception of a pre-scan start instruction request from the host computer 300, the control inquires the host computer 300 as to whether or not it holds LED ON time data and shading correction data, and checks based on its response if the host computer 300 stores these pieces of information. As a result, if the host computer 300 stores the LED ON time data and shading correction data, the control requires the host computer 300 of the LED ON time data and shading correction data, and downloads them to this image scanning device to make various setups in step S804.

Figure 9A:
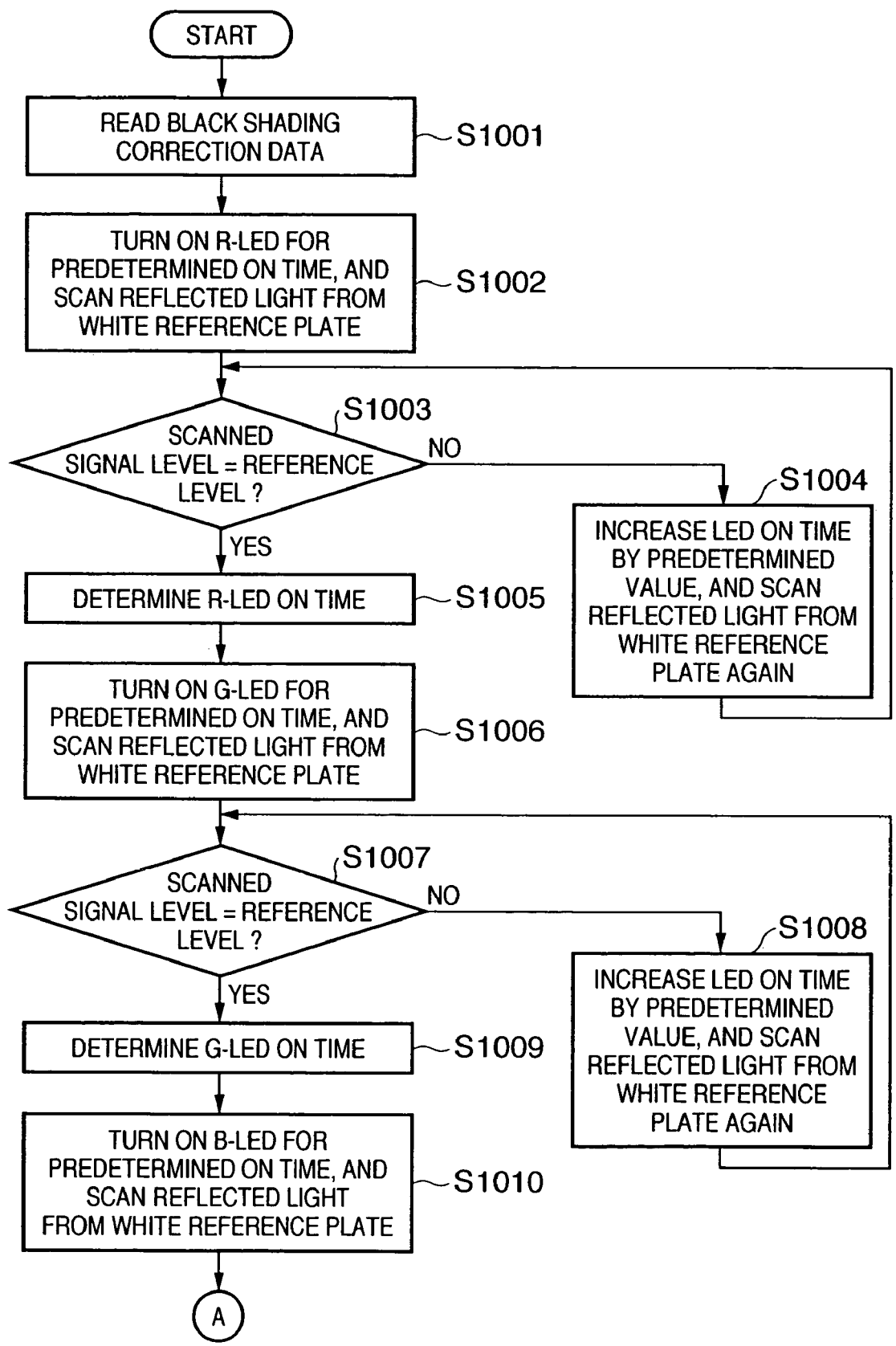
FIGS. 9A and 9B are flowcharts showing the setting processing sequence of ON time data and shading correction data of the first embodiment.
Figure 9B:
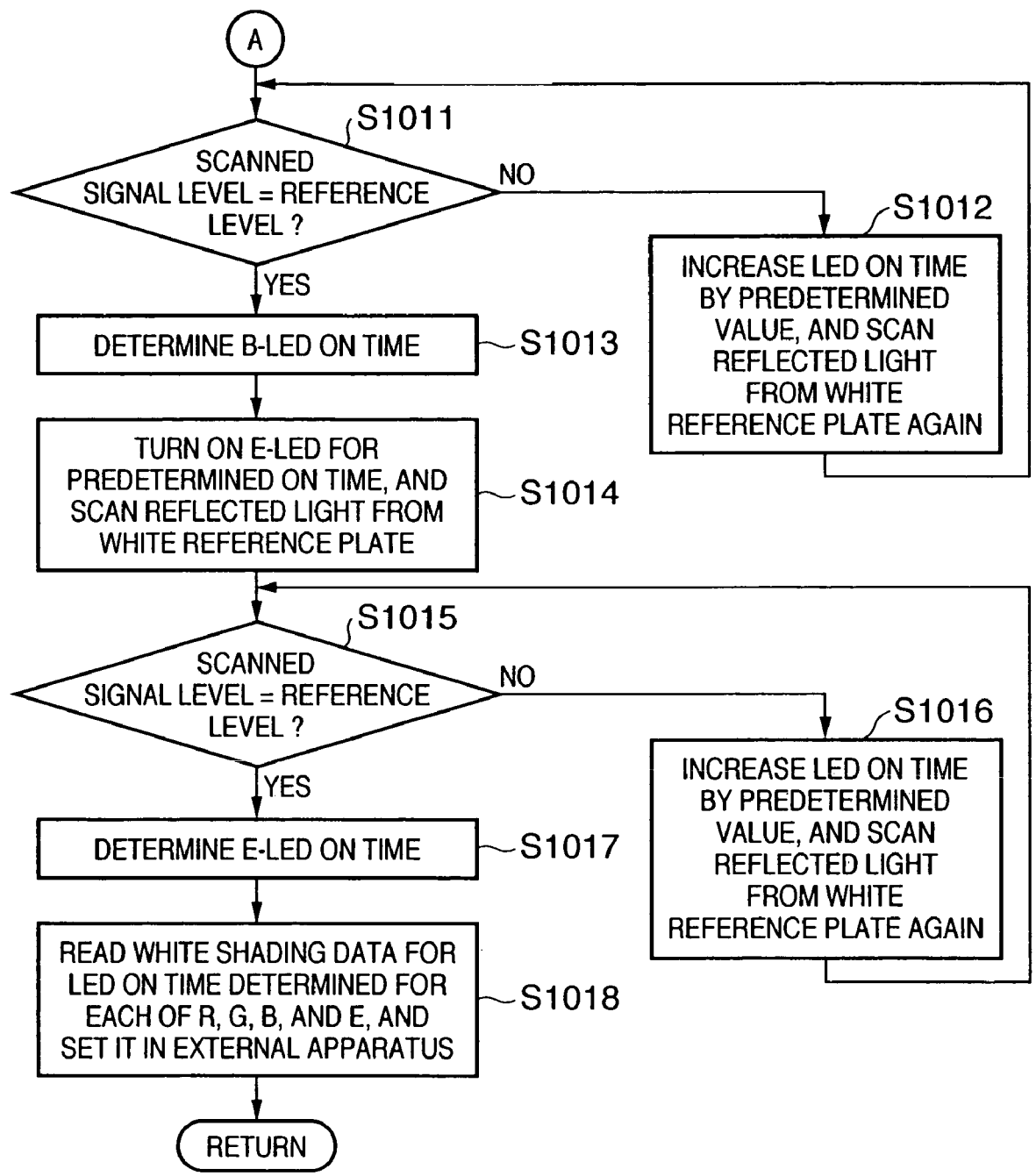

On the other hand, if it is determined in step S803 that the host computer 300 does not store any LED ON time data and shading correction data, the flow advances to step S805 to generate LED ON time data and shading correction data. FIG. 8 is a timing chart of the generation process of the LED ON time data and shading correction data in step S805, and FIGS. 9A and 9B shows the processing sequence of that process. The generation process will be described below with reference to these figures. Note that a case will be explained below wherein "32-bit multi-valued" is designated as the scan mode.

In step S1001, the output signal from the monochrome image sensor 102 is read as black shading correction data while all the LEDs are OFF, and is set in the external apparatus (host computer) 300. With this setup, offsets, variations, and the like for respective pixels due to the monochrome image sensor 102 can be corrected.

Next, the LED ON times of respective colors are determined.

In step S1002, only the R-LED is turned on for predetermined ON time T0 within which the scan signal level from the monochrome image sensor 102 does not exceed a reference level set in the AFE circuit 201, and light reflected by the white reference plate is scanned by the monochrome image sensor 102.

It is checked in step S1003 if the scanned signal level has reached the reference level. As a result, the scanned signal level has not reached the reference level, the flow advances to step S1004 to increment an R-LED ON time by a predetermined value ΔT, and light reflected by the white reference plate is scanned again. In this way, the ON time is gradually increased, and if it is determined that the reference level has been reached, the LED ON time at that time is set as an ON time upon scanning an image for one line of the R-LED.

The ON times of the remaining G-, B-, and E-LEDs are determined by substantially the same processes. That is, steps S1006 to S1009 are processes for determining the ON time of the G-LED, steps S1010 to S1013 are processes for determining the ON time of the B-LED, and steps S1014 to S1017 are processes for determining the ON time of the E-LED.

After the ON times of the LEDs of all the color components are determined, the flow advances to step S1018 to scan light reflected by the white reference plate for the LED ON times determined in correspondence with R, G, B, and E, and white shading correction data is output to and is stored and held by the host computer 300.

The processes executed when the scan mode is the "32-bit multi-valued" mode have been explained. In the "24-bit multi-valued" mode, the processes in steps S1014 to S1017 are skipped since they are not required. In the "binary" mode, the processes in steps S1002 to S1005 and S1010 to S1017 are skipped since only the G-LED is turned on and these processes are not required.

Step S805 in FIG. 2 has been explained. Upon completion of the setups of the LED ON time data and shading correction data, the flow advances to step S806.

In step S806, a pre-scan is executed. The pre-scan is a preliminary scan operation, and scans a document image at a resolution lower than a final scan (main scan) so as to inform the user of an overview of the scanned image to some extent. Hence, the scan speed in the pre-scan (the moving direction of the CIS 101 in the sub-scan direction) is higher than that in the main scan.

This scan process will be explained below with reference to the timing chart in FIG. 8.

The R-LED is turned on while moving the CIS 101 in the sub-scan direction, and the monochrome image sensor 102 scans a document to be scanned only for one line. That is, red light reflected by the document to be scanned is accumulated on the monochrome image sensor 102. Upon completion of the accumulation time for one line, the G-LED is turned on in turn. During this period, the scan signal for one line in the main scan direction of the R component accumulated so far is output from the monochrome image sensor 102 as an output signal, which is output to the host computer 300 via respective circuits. Likewise, the B-LED is turned on, and G data is output during the B accumulation time. After that, the E-LED is turned on, and B data is output during the E accumulation time. Upon completion of the ON time of the E-LED, the CIS 101 has moved by a width for one line in the sub-scan direction from the ON start position of the R-LED. The R-LED is turned on to scan the next line. The E component data for the current line is output during the ON time (accumulation time) of the R-LED for the next line.

As a result, in the scan process in the scan mode (32-bit multi-valued mode) using the four, i.e., R, G, B, and E LEDs, when the CIS 101 is located at a given position, R, G, B, and E data are output to the host computer 300 for one line. In the binary scan mode, every time a G component for one line is scanned, the CIS 101 is moved by a 1-line width in the sub-scan direction.

The aforementioned processes are executed until it is determined in step S807 that scans for designated lines are complete. As a result, the user can confirm an overview of a pre-scanned document image on the host computer 300.

It is then checked in step S808 if a main scan request command is received. Upon reception of this request command, a scan process for one line is executed in step S809, and this process is repeated until it is determined in step S810 that the scan processes for designated lines are complete. The differences between the main scan and pre-scan are as follows. That is, the main scan scans according to the scan resolution set by the user, while the pre-scan scans by decreasing the number of data per line compared to the main scan by decimating appropriate pixel signals output from the monochrome image sensor 102. Also, the main scan narrows down the 1-line width of movement of the CIS 101 in the sub-scan direction than that in the pre-scan. In other words, the main scan scans at a higher resolution, while the pre-scan scans at a relatively lower resolution since an overview of an image need only be recognized.

The image scanning device of this embodiment has been explained. The processes in the image processing circuit 203 in this embodiment will be explained below.

Figure 5:
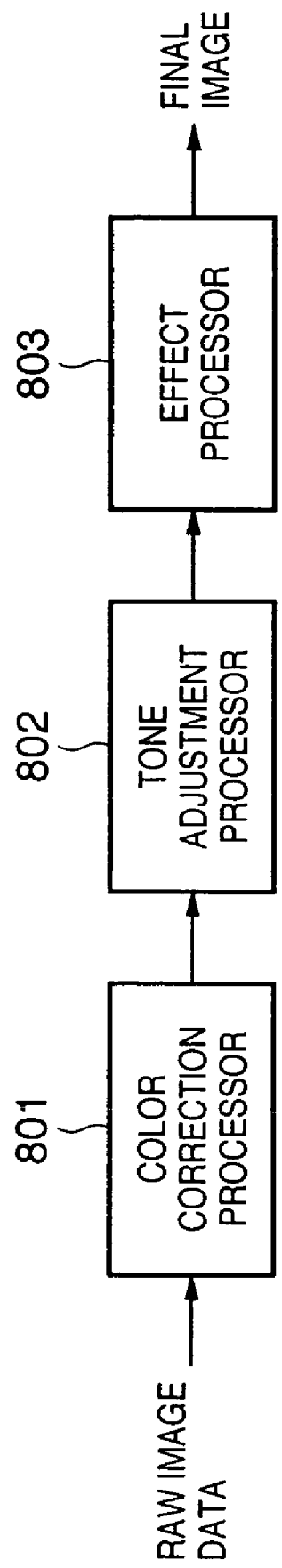
FIG. 5 is a block diagram showing principal part of an image processing circuit shown in FIG. 2.

FIG. 5 is a block diagram showing principal part of the image processing circuit 203 in this embodiment.

A color correction processor 801 multiplies raw image data scanned by the image scanning device of this embodiment by color correction processing coefficients according to the selected scan mode (to be described in detail later). A tone adjustment processor 802 adjusts lightness. An effect processor 803 applies effect processes for improving image quality such as an edge emphasis process, noise reduction process, and the like, and outputs a final image.

The color correction processor 801 will be described in more detail below.

The pre-scan or main scan instruction request and the scan mode designation are received from the host computer, as has been described above. This scan mode is also set in the color correction processor 801. This is to attain matching between the sender side (image scanning device) of image data and the receiver side (scanner driver).

If the scan mode is the binary mode, since one pixel is expressed by 1 pixel, the tone adjustment processor 802 and effect processor 803 do not execute any processes, and image data is directly output.

On the other hand, if the 24-bit multi-valued mode is set as the scan mode, the color correction processor 801 executes the following processes. In the following description, Rc, Gc, and Bc indicate corrected data, and data without any suffixes indicate data from the shading correction circuit 202.

$$Rc=0.927\times R+0.177\times G-0.104\times B$$

$$Gc=-0.013\times R+1.204\times G-0.191\times B$$

$$Bc=-0.023\times R-0.049\times G+1.072\times B \quad (1)$$

Figure 3:
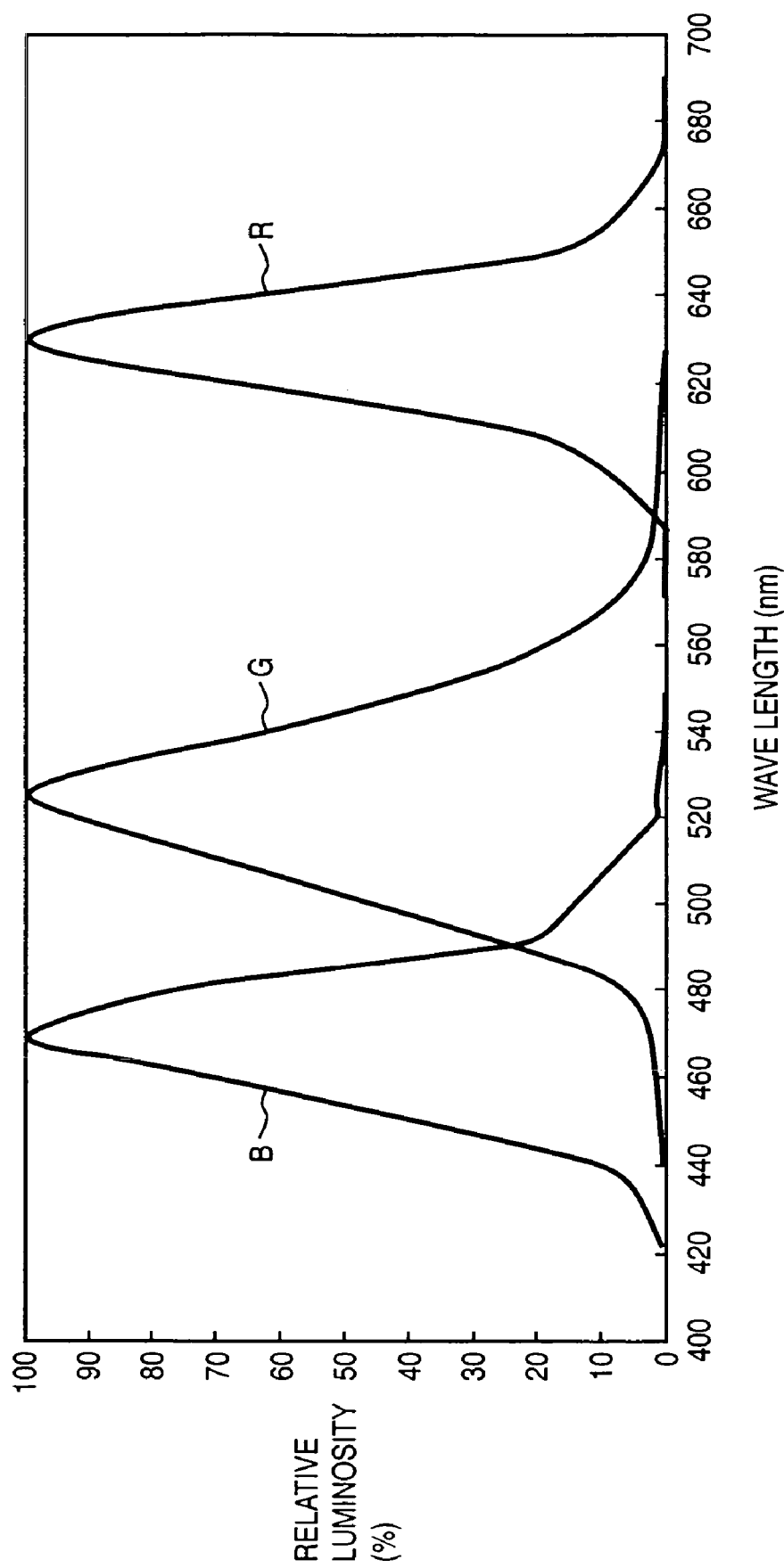
FIG. 3 shows the luminous spectrum characteristics of R, G, and B LEDs.

The above equations will be explained in more detail. As described above, the LEDs as the R, G, and B light sources in this embodiment respectively have dominant emission wavelengths of 630 nm (R LED), 525 nm (G LED), and 470 nm (B LED), as shown in FIG. 3. By contrast, in the luminosity characteristics of human eyes, the barycentric position of R component sensitivity is approximately 620 nm, that of G component sensitivity is approximately 545 nm, and that of B component sensitivity is approximately 450 nm, resulting in differences between color components of the human eye and LEDs.

In other words, it is desired to shift the wavelength of an R component obtained from the shading correction circuit 202 toward the short wavelength side, that of a G component toward the long wavelength side, and that of a B component toward the short wavelength side.

However, R, G, and B data output from the shading correction data 202 do not include any wavelength components by now but include only their light-receiving intensities. Hence, data of the color components R, G, and B are considered as wavelength data since the magnitude relationship of their wavelengths meet B<G<R, and correction substantially equivalent to movement of their barycentric positions is attained by multiplying R, G, and B by weighting coefficients and adding/subtracting them to/from each other, i.e., operating R, G, and B as composite wavelength components. That is, in order to shift an R component toward the short wavelength side, the data value of an input R component is decreased, and values to be added to G and B components are increased. In order to shift a G component toward the long wavelength side, the ratio of increasing the G component is set to be large, and the ratio of subtracting the value of a B component is set to be large. Equations (1) above are derived as a result of examinations of various corrections and color reproducibilities on the basis of consideration of such correlation among R, G, and B. According to equations (1) above, it was demonstrated that the LED luminous spectrum characteristics shown in FIG. 3 become nearly equivalent to those which have undergone correction shown in FIG. 6.

Figure 6:
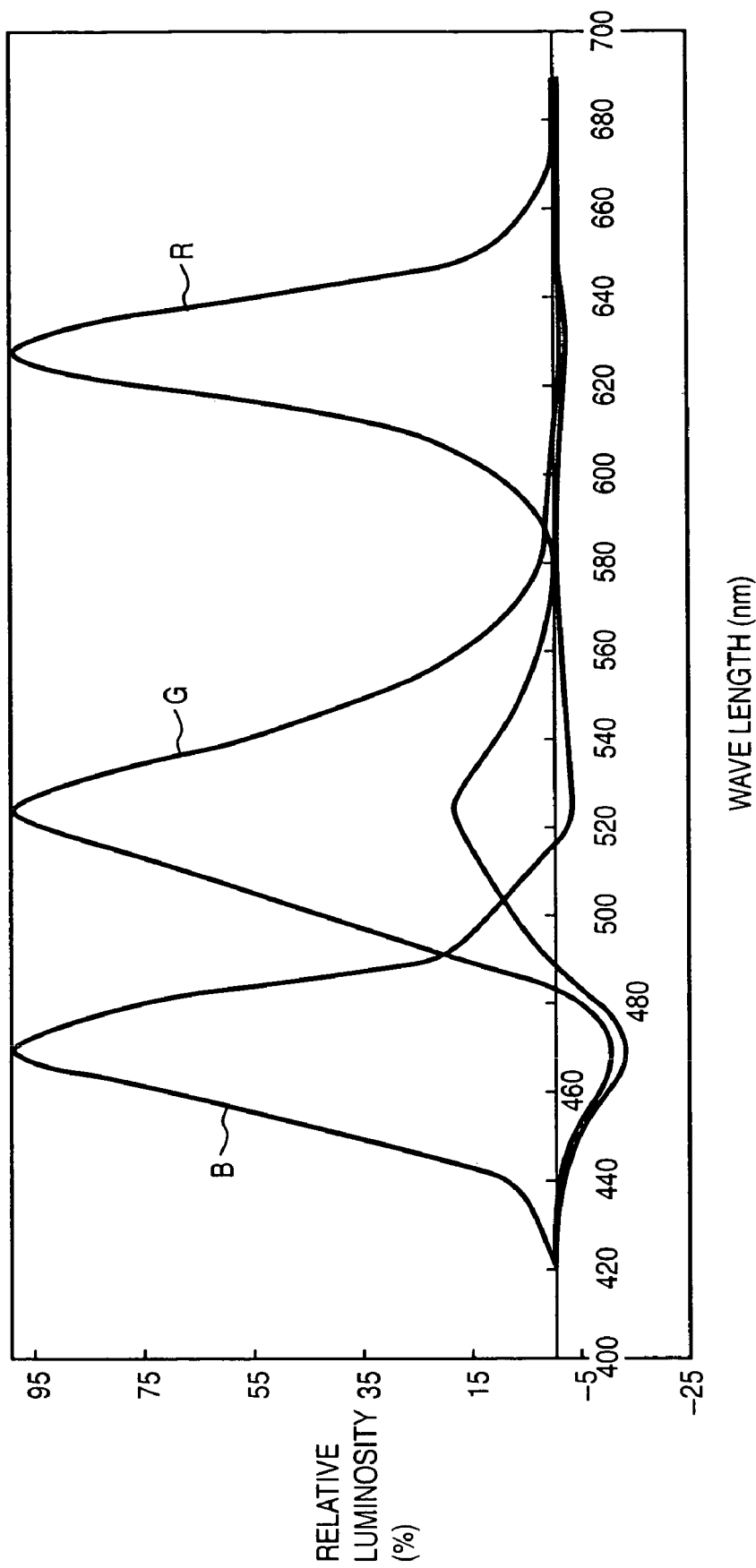
FIG. 6 shows the luminous spectrum characteristics after correction of the first embodiment.

As shown in FIG. 6, since the ratio of the red component that becomes involved with the green component increases, the same effect as that obtained when the barycentric position of the luminous spectrum characteristics (luminous spectrum distribution) of the R component shifts (moves) toward the short wavelength side is obtained. Also, the same effect as that obtained when the G component shifts (moves) toward the long wavelength side, and the same effect as that obtained when the B component shifts (moves) toward the short wavelength side are obtained. That is, after the arithmetic operations of equations (1), the barycentric positions of the R, G, and B components have moved to the vicinities of 620 nm, 530 nm, and 470 nm, and the characteristics approximate to CIE-RGB shown in FIG. 4 can be obtained. As described above, by making the arithmetic operations given by equations (1), upon scanning in the 24-bit multi-valued mode, color reproducibility higher than that obtained without any correction can be obtained.

On the other hand, if the 32-bit multi-valued mode is set, the color correction processor 801 converts data of color components R, G, B, and E into R, G, and B component data that can be used by the personal computer via equations (2) below. In equations (2), data with suffixes "c" indicate converted data, and data without any suffixes indicate input color component data.

$$Rc=0.947\times R+0.192\times G-0.119\times B-0.018\times E$$

$$Gc=-0.020\times R+1.972\times G+0.031\times B-0.983\times E$$

$$Bc=-0.023\times R+0.127\times G+1.080\times B-0.184\times E \quad (2)$$

Figure 10:
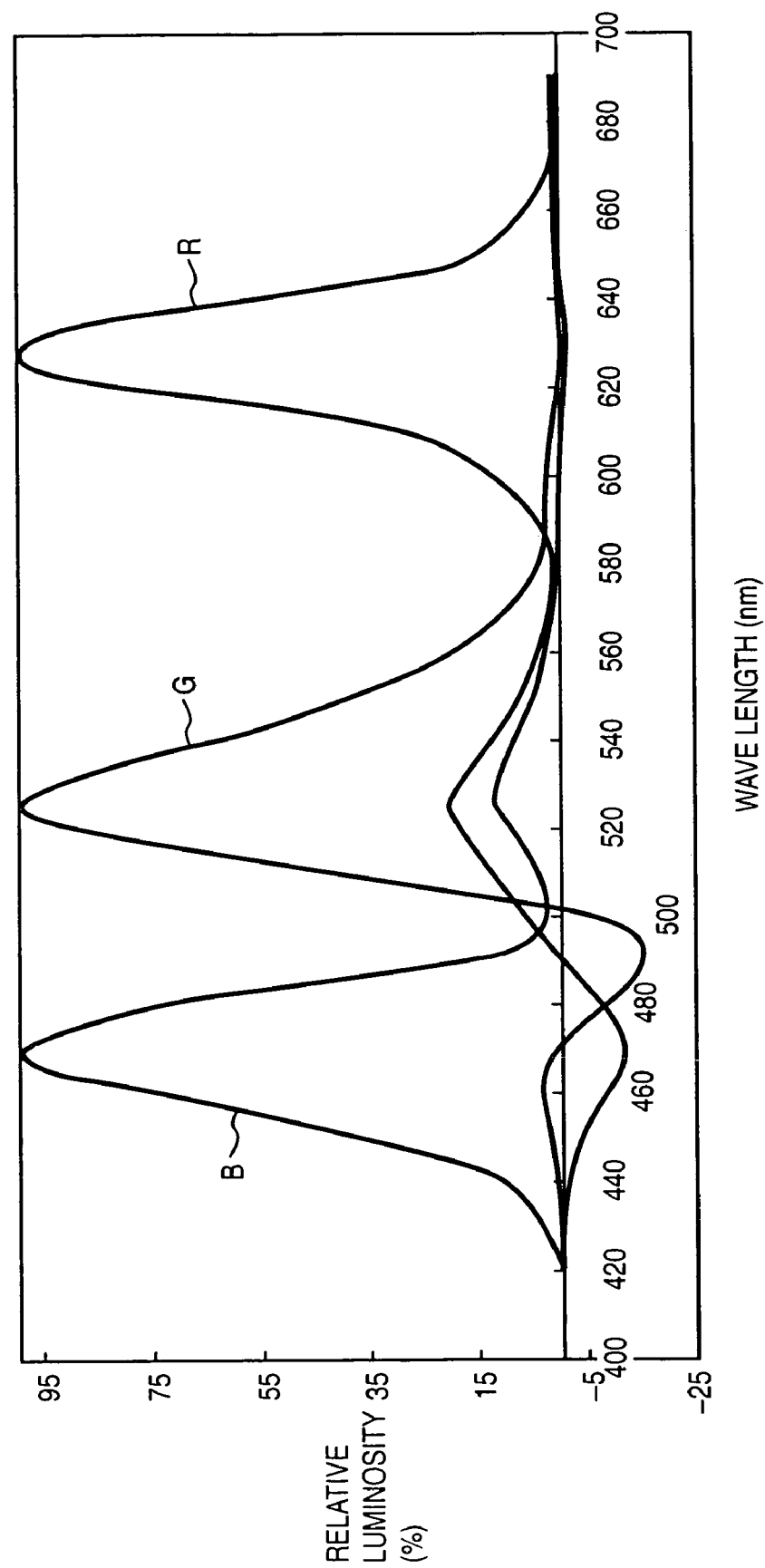
FIG. 10 shows the luminous spectrum characteristics after correction of the second embodiment.

FIG. 10 shows the luminous spectrum characteristics equivalent to these conversion results. As shown in FIG. 10, since the E-LED is used, and the correction based on equations (2) is applied, the barycentric position of the red luminous spectrum characteristics shifts toward the short wavelength side, and can become closer to that of the luminous spectrum characteristics of a red component of CIE-RGB compared to the correction of equations (1). As for a green component, an emerald wavelength component of the green component is largely subtracted, as can be seen from FIG. 10. Furthermore, the half wavelength of the green component on the short wavelength side shifts from the vicinity of 500 nm to that of 510 nm, and the barycentric position of the luminous spectrum characteristics shifts toward the long wavelength side and tends to be closer to that of the luminous spectrum characteristics of the green component of CIE-RGB.

As described above, in the 32-bit multi-valued image scan mode using the four, i.e., R, G, B, and E LEDs, the LED luminous spectrum characteristics can be precisely approximate to those of CIE-RGB, thus further improving the color reproducibility.

In this embodiment, the four-color scan mode is made in the order of R, G, B, and E as shown in FIG. 8 upon focusing attention on one line to be scanned for the following reason.

E component data described in this embodiment has a large overlap wavelength range with the G component of the R, G, and B components, as can be seen from FIG. 12. That is, the E component data has a highest correlation coefficient with the G component. When conversion from four colors into three colors based on equations (2) is made, G component data after three-color conversion is mainly generated from G and E components before conversion. Also, the human eye have a highest spectral luminous efficacy with respect to the G component which includes a wavelength of 555 nm as nearly the center of the visible light range.

FIG. 16A shows a case wherein E and G components are scanned successively, and FIG. 16B shows a case wherein E and G components are scanned every other colors. As shown in FIG. 16A, when E and G components are successively scanned, the sampling period in the sub-scan direction with respect to colors in the overlap wavelength range of the E and G components becomes equal to those of R and B components. However, when the E and G components are scanned every other colors, the sampling period in the sub-scan direction is raised with respect to colors in the overlap wavelength range of the E and G components.

In this way, since the control is made not to successively scan a G component to which the human eye has a highest spectral luminous efficacy and an E component having high correlation with the G component and having a second highest spectral luminous efficacy, i.e., to scan E and G components every other color components, the resolution in the sub-scan direction can be improved with respect to colors in the overlap wavelength range of the E and G components. Therefore, as the scan order of respective color components, an R or B component is preferably scanned between G and E components. More specifically, the control is preferably made to scan by turning on the color LEDs in the order of R, G, B, and E described in this embodiment or in the order of R, E, B, and B.

Second Embodiment

In the first embodiment, the color correction processes in the three-color scan mode and four-color scan mode are executed on the image scanning device side. Alternatively, the scanned R, G, and B or R, G, B, and E component data may be output to the host computer, which may execute the correction processes. When the correction processes are done on the host computer side, that correction function can be added to an image scanner driver which runs on the host computer. As a result, the edit processes that can obtain the effects of the above embodiment can be made without modifying a normal image processing application.

An implementation example of the color correction processes by a scanner driver on the PC 300 side will be explained hereinafter as the second embodiment.

The structure of the image scanning device is the same as that shown in FIG. 7. However, when the 32-bit multi-valued mode is set, the image scanning device directly outputs 8-bit data of R, G, B, and E components to the PC 300.

Figure 13:
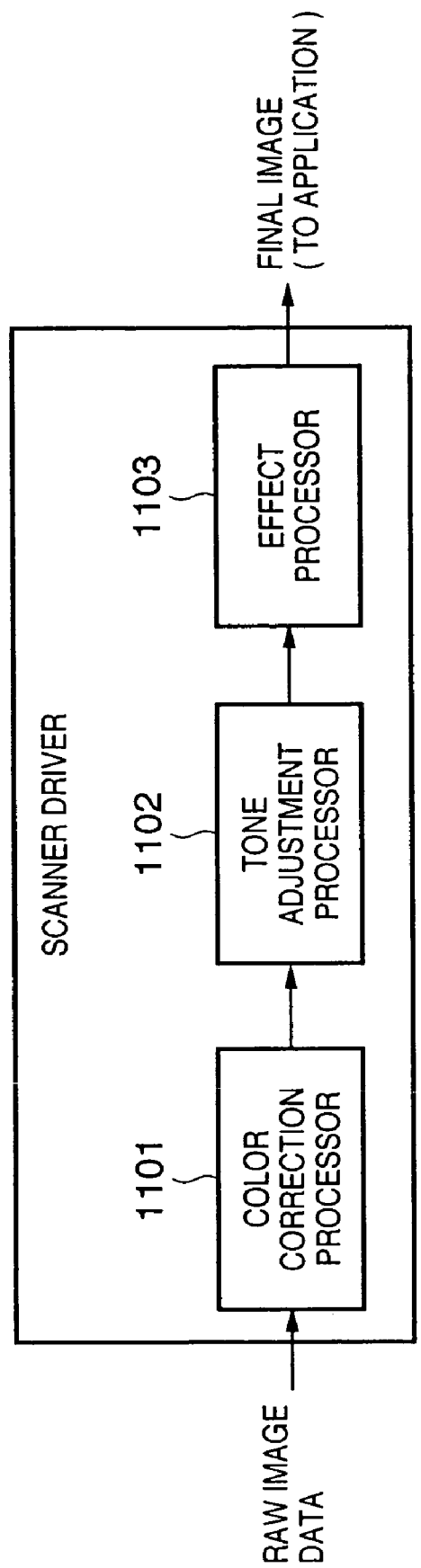
FIG. 13 is a functional block diagram of a scanner driver which runs on a host computer in a modification of the second embodiment.

FIG. 13 is a functional block diagram of a part that pertains to image reception of a scanner driver which runs on the host computer 300 in this modification (a GUI part used to issue commands to the image scanning device, and a processing part that pertains to transmission of LED ON time data and shading correction data are not shown).

A color correction processor 1101 multiplies raw image data scanned by the image scanning device of this embodiment by color correction processing coefficients according to the selected scan mode (to be described in detail later). A tone adjustment processor 1102 adjusts lightness. An effect processor 1103 applies effect processes for improving image quality such as an edge emphasis process, noise reduction process, and the like, and outputs a final image to an application as a read source (in general, an image edit application or the like).

The color correction processor 1101 will be described in more detail below.

Upon transmitting the pre-scan or main scan instruction to the image scanning device, the scan mode is set in the image scanning device, as has been described above. This scan mode is also set in the color correction processor 1101. This is to attain matching between the sender side (image scanning device) of image data and the receiver side (scanner driver).

If the scan mode is the binary mode, since one pixel is expressed by 1 pixel, the tone adjustment processor 1102 and effect processor 1103 do not execute any processes, and image data is directly output to an application.

On the other hand, if the 24-bit multi-valued mode (three-color LED scan mode) or 32-bit multi-valued mode (four-color LED scan mode) is set as the scan mode, the color correction processor 1101 executes the following processes. In the following description, Rc, Gc, and Bc indicate corrected data, and data without any suffixes indicate raw data from the image scanning device.

In case of 24-bit multi-valued mode:

$Rc=0.927\times R+0.177\times G-0.104\times B$ $Gc=-0.013\times R+1.204\times G-0.191\times B$ $Bc=-0.023\times R-0.049\times G+1.072\times B$ (3)

In case of 32-bit multi-valued mode:

$Rc=0.947\times R+0.192\times G-0.119\times B-0.018\times E$ $Gc=-0.020\times R+1.972\times G+0.031\times B-0.983\times E$ $Bc=-0.023\times R+0.127\times G+1.080\times B-0.184\times E$ (4)

As a result of the above processes, in either of the 24- or 32-bit multi-valued mode, conversion to three primary colors, i.e., R, G, and B data expressed by a personal computer or the like is made.

Figure 15:
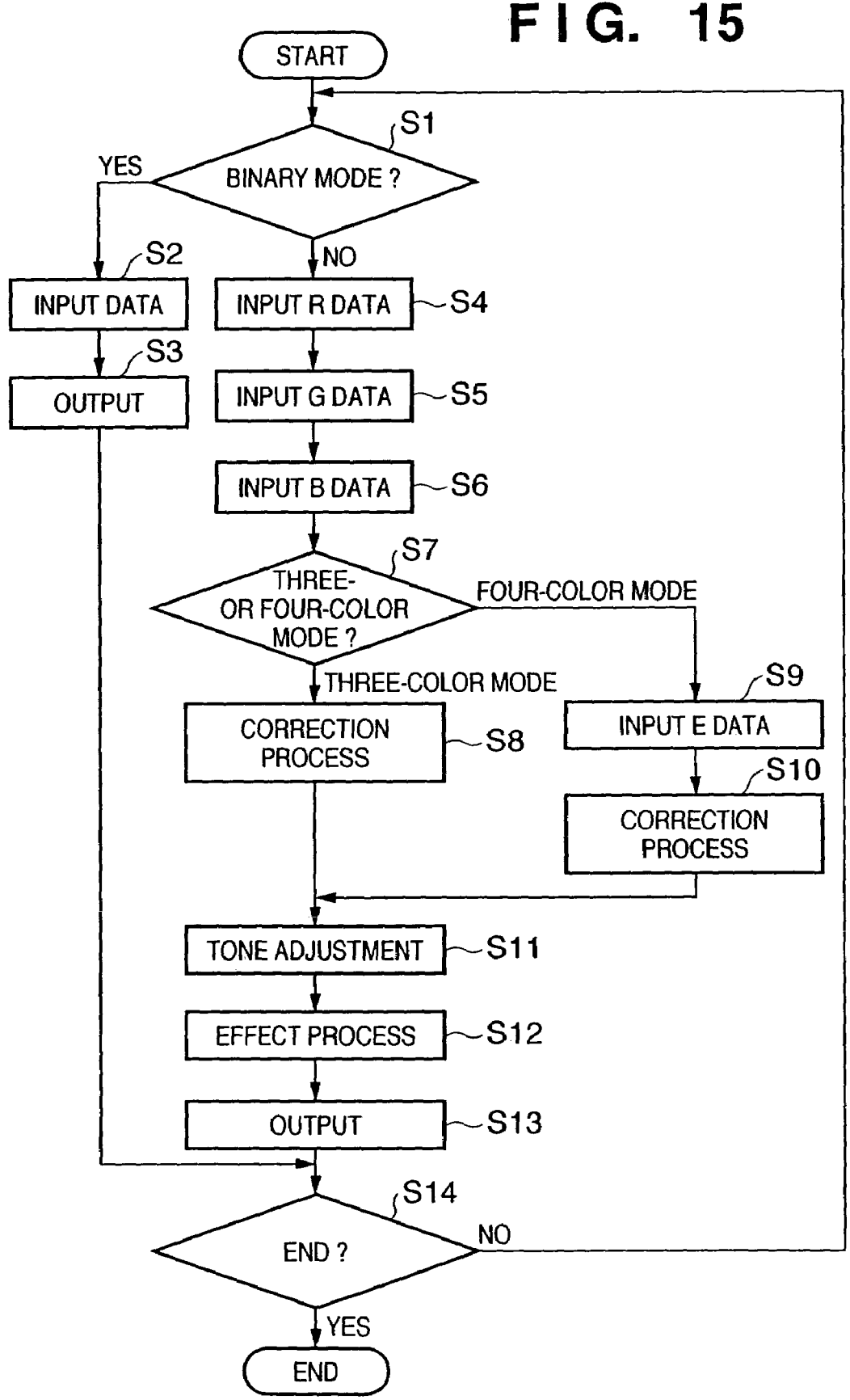
FIG. 15 is a flowchart showing the processing contents of the scanner driver in the modification of the second embodiment.

FIG. 15 is a flowchart showing an example of the reception process of image data in the scanner driver program of this embodiment.

It is checked in step S1 if the scan process has been made in the binary scan mode. If it is determined that the scan process has been made in the binary scan mode, the flow advances to step S2 to receive binary data for one line. In step S3, the binary data is output to an application which has launched this scanner driver.

On the other hand, if it is determined that the scan process has been made in the three- or four-color LED scan mode, R, G, and B data for one line are received and are stored in an appropriate area of a RAM of the host computer in steps S4 to S6. If the three-color LED scan mode is determined in step S7, the flow advances to step S8 to apply the correction processes based on equations (3) above. On the other hand, if the four-color LED scan mode is determined, the remaining E data is received in step S9, and the correction processes based on equations (4) above are applied in step S10.

After that, tone adjustment is applied in step S11, and the effect process is applied in step S12. In step S13, the R, G, and B data are output to the application which has launched this scanner driver.

In this manner, image data for one line is output to the application. It is checked in step S14 if data for the number of lines designated by the scan instruction have been received. If NO in step S14, the processes in step S1 and subsequent steps are repeated.

The present inventors confirmed the presence of the following differences in association with the color reproducibility of R, G, and B, three-primary-color scanned image data and that of four-color scanned image data.

Image data, which are obtained by scanning "IT8 chart" normally used for color calibration of input and output devices in the 24- and 32-bit multi-valued modes using the image scanning device of this embodiment, are corrected by the aforementioned processes to generate R, G, and B image data of three, R, G, and B components, and the R, G, and B image data are converted into image data on the Lab color space via the XYZ color space. Color conversion colors used in this case are as follows (note that the light source is of D65 type):

$$X = 0.4124 \times Rc + 0.3576 \times Gc + 0.1805 \times Bc$$

$$Y = 0.2126 \times Rc + 0.7152 \times Gc + 0.0722 \times Bc$$

$$Z = 0.0193 \times Rc + 0.1192 \times Gc + 0.9505 \times Bc$$

$$L = 116 \times (Y/Y0)^{0.333} - 16$$

$$a = 500 \times [(X/X0)^{0.333} - (Y/Y0)^{0.333}]$$

$$b = 200 \times [(Y/Y0)^{0.333} - (Z/Z0)^{0.333}] \quad (5)$$

for X0=0.95045, Y0=1.0, and Z0=1.08906.

A color difference ΔE is calculated from the L, a, and B image data calculated using equations (5) and the colorimetric values of the IT8 chart. The color difference ΔE is given by:

$$\Delta E = (\Delta L^2 + \Delta a^2 + \Delta b^2)^{1/2}$$

where ΔL, Δa, and Δb are the differences between the image data obtained by the image scanning device of this embodiment, and calorimetric data of a document.

Figure 14:
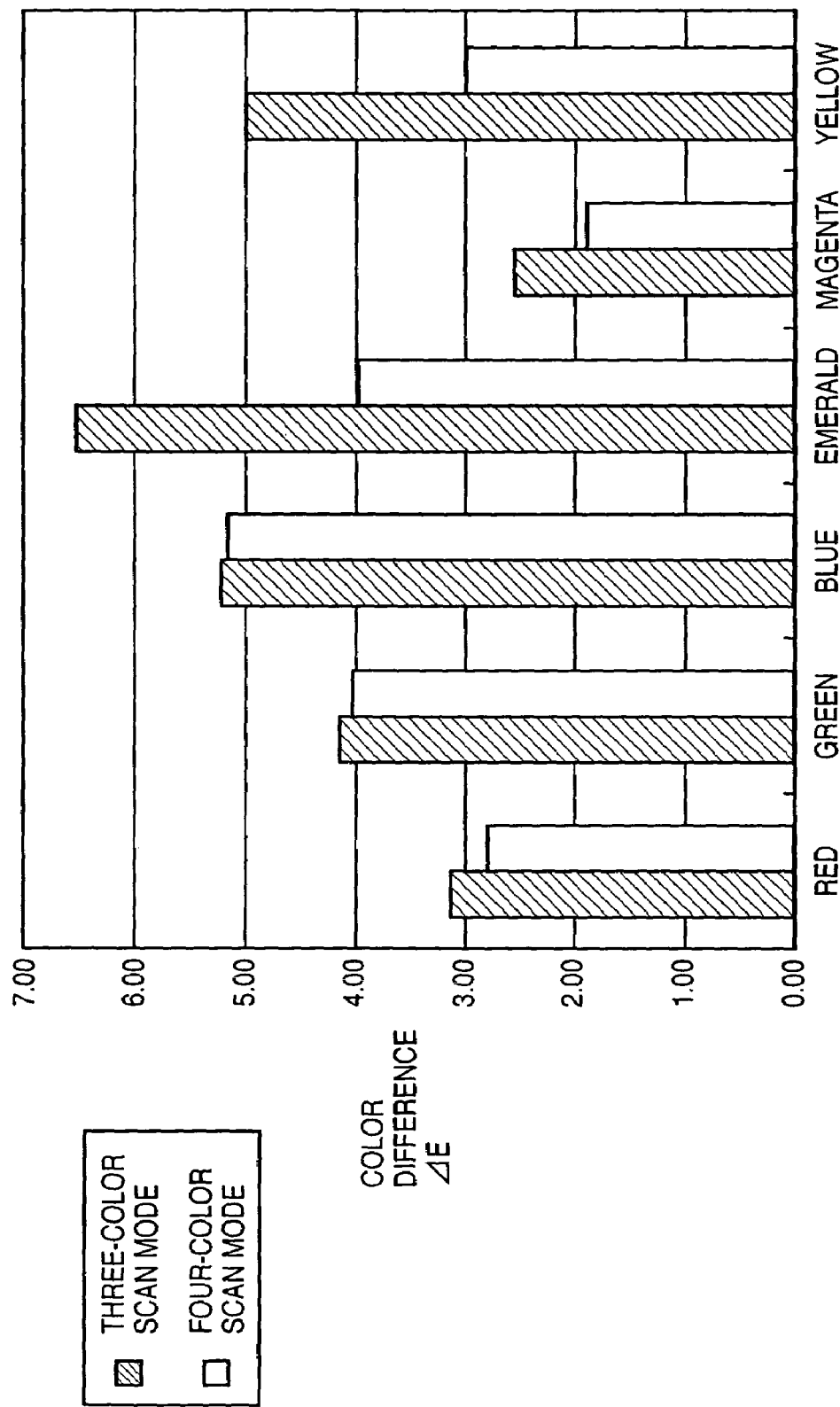
FIG. 14 shows color difference characteristics of 3- and 4-color scan modes.

FIG. 14 shows the comparison results of representative colors (red, green, blue, emerald, magenta, yellow) of the color differences ΔE of the three- and four-color scan modes, which are calculated by the above formula. As shown in FIG. 14, red, green, and blue have substantially no differences or small differences between the three- and four-color scan modes. However, emerald, magenta, and yellow have smaller color differences in the four-color scan mode than the three-color scan mode. Especially, as seen easily, "emerald (E component)" as the fourth light-emitting member has a large difference, and the four-color scan mode has higher color reproducibility.

In the above example, in the three- and four-color scan modes, the host computer performs conversion and correction to R, G, and B data. Alternatively, the image scanning device may perform such conversion and correction. In this case, the load on the image scanning device becomes heavier and line buffers for four colors (required to calculate R. G, and B data) must be added. However, the host computer can exploit an existing three-color scanner driver. Note that since the existing scanner driver cannot designate the four-color scan mode, a control panel or the like equipped on the image scanning device must be used to designate that mode.

Figure 11:
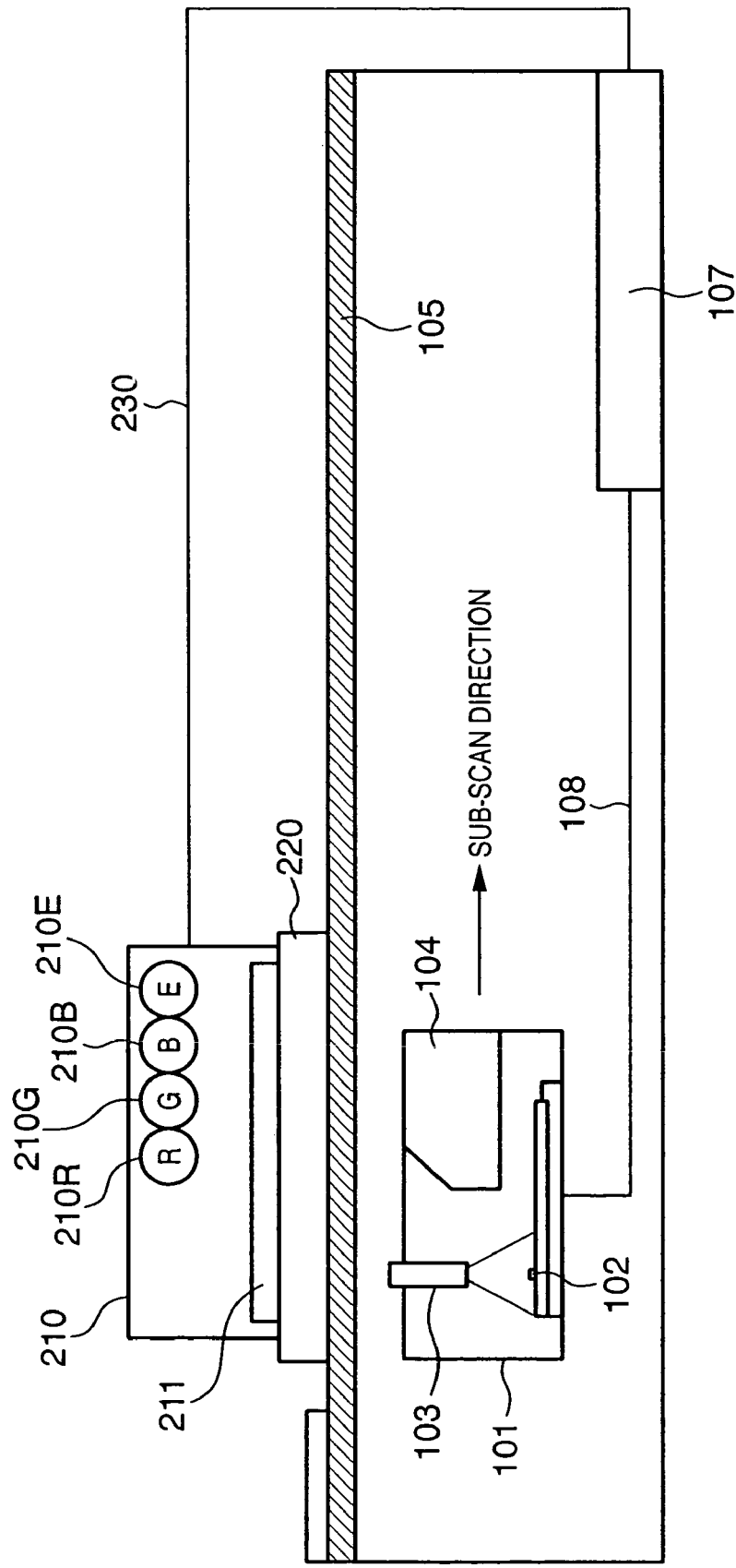
FIG. 11 is a schematic sectional view of a device which scans a transmitting document and is to be applied to the second embodiment.

As described above, according to this modification, the image scanning device shown in FIG. 11 and the host scanner driver program on the host computer 300 can obtain an image with high color reproducibility. Hence, since the scanner driver program on the host computer implements the aforementioned processes, the scope of the present invention includes such computer program. Normally, since the computer program is stored in a computer-readable storage medium such as a CD-ROM or the like, which is set in a reader of the computer, and is ready to run when the program is copied or installed in the system, the scope of the present invention also includes such computer-readable storage medium.

Third Embodiment

A case will be explained below wherein the transmitting document illumination unit 210 (see FIG. 7) is used. The transmitting document illumination unit 210 includes four LEDs, i.e., R, G, B, and E LEDs if it is applied to the first embodiment.

Nowadays, a four-layered silver halide film to which a color sensitive layer sensitive to emerald is added in addition to red, green, and blue color sensitive layers is commercially available, as disclosed in Japanese Patent Laid-Open No. 2003-84402. Since the transmitting document illumination unit 210 of this embodiment includes four, R, G, B, and E light sources (LEDs) as in the above description, it scans a transmitting document of such four-layered silver halide film, thus obtaining a scanned image with higher color reproducibility.

FIG. 11 is a sectional view when the transmitting document illumination unit 210 is connected to the interface 208 of this device via a cable 230. In FIG. 11, reference numeral 220 denotes a film holder which holds a film to be scanned. The film holder has an opening (not shown) for one frame of the film, and the transmitting document illumination unit 210 is set above the holder. The transmitting document illumination unit 210 includes an R light-emitting LED 210R, G light-emitting LED 210G, B light-emitting LED 210B, and E light-emitting LED 210E, one of which is turned on as in the optical waveguide 104. Reference numeral 211 denotes a panel which two-dimensionally, uniformly emits light upon emission of light by each LED, and has a size at least larger than that of one frame of the film. Since details of alignment and the like between the film holder and transmitting document illumination unit are explained in Japanese Patent Laid-Open No. 2004-7547 that has already proposed by the present applicant, a description thereof will be omitted.

Upon detection of connection of the transmitting document illumination unit 210 to this device (an appropriate switch is provided to the interface 208, and detection is made based on the state of that switch), the controller 200 disables the optical waveguide 104, and determines the transmitting document illumination unit 210 as an object to be driven.

Since the actual scan process is substantially the same as that in the above embodiment except that the LEDs in the optical waveguide light source 104 are switched to those of the transmitting document illumination unit 210, and movement in the sub-scan direction is made in correspondence with the film size, a description thereof will be omitted.

As described above, upon scanning a four-layered silver halide film or the like to which a color sensitive layer sensitive to emerald is added in addition to normal R, G, and B color sensitive layer, the scan process of this embodiment can be performed by sufficiently utilizing the film characteristics, thus obtaining a scanned image with higher color reproducibility.

Note that the image scanning device of this embodiment has exemplified an image scanner as a peripheral device of the host computer, but may be applied to a document scanner of a copying machine. When the image scanning device of this embodiment is applied to the copying machine, a print process is made after conversion RGBE→RGB→YMCK.

In this embodiment, the contact image sensor (CIS) has been exemplified. However, since the present invention can be applied to a device using a CCD, the present invention is not limited to the aforementioned specific embodiments. Furthermore, the present invention can be applied to not only a device that scans a document image using four colors, but also a device that scans a document image using five or more colors. As described above, according to the present invention, the color reproducibility of a scanned image can be improved compared to the conventional document scan process using R, G, and B light-emitting members.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-031404 and 2004-031405, both filed on Feb. 6, 2004, which is hereby incorporated by reference herein.

What is claimed is:

1. An image scanning device comprising:
   an illumination unit for illuminating a document while selectively turning on visible light beams of at least four colors in turn;
   an image scanning unit for scanning the document image illuminated by said illumination unit and outputting image data of respective colors;
   a moving unit for relatively moving the document image and said image scanning unit; and
   a control unit for, when said image scanning unit executes scan processes of the document image for respective colors while performing relative movement by said moving unit, controlling not to successively execute the scan process of a first color having highest spectral luminous efficacy among the visible light beams of at least four colors and the scan process of a second color having second highest spectral luminous efficacy.

2. The device according to claim 1, wherein said illumination unit turns on at least red, green, blue, and emerald light beams, and said control unit controls said illumination unit to selectively turn on the light beams of respective colors in an order of red, green, blue, and emerald or red, emerald, blue, and green.

3. The device according to claim 1, wherein said illumination unit is integrated with said image scanning unit.

4. The device according to claim 1, wherein said illumination unit includes a unit which illuminates light from a back surface of a document.

5. The device according to claim 1, further comprising a setting unit for setting one of a first document scan mode for illuminating the document using said illumination unit while selectively turning on visible light beams of less than four colors, and scanning the document image using said image scanning unit, and a second document scan mode for illuminating the document using said illumination unit while selectively turning on visible light beams of at least four colors, and scanning the document image using said image scanning unit.

6. The device according to claim 5, wherein said unit sets one of the first and second document scan modes in accordance with instruction information from an apparatus to which a scanned image is to be output.

7. The device according to claim 1, further comprising an arithmetic unit for calculating composite wavelength component data by making predetermined arithmetic operations using as wavelength component data image data of respective colors obtained by scanning the document image by said image scanning unit.

8. A method of controlling an image scanning method, which has an illumination unit for illuminating a document while selectively turning on visible light beams of at least four colors in turn, an image scanning unit for scanning the document image illuminated by said illumination unit and outputting image data of respective colors, and a moving unit for relatively moving the document image and said image scanning unit, comprising a step of:
   controlling, when said image scanning unit executes scan processes of the document image for respective colors while performing relative movement by said moving unit, not to successively execute the scan process of a first color having highest spectral luminous efficacy among the visible light beams of at least four colors and the scan process of a second color having second highest spectral luminous efficacy.

9. The method according to claim 8, wherein said illumination unit turns on at least red, green, blue, and emerald light beams, and said control unit controls said illumination unit to selectively turn on the light beams of respective colors in an order of red, green, blue, and emerald or red, emerald, blue, and green.

10. The method according to claim 8, further comprising a setting step of setting one of a first document scan mode for illuminating the document using said illumination unit while selectively turning on visible light beams of less than four colors, and scanning the document image using said image scanning unit, and a second document scan mode for illuminating the document using said illumination unit while selectively turning on visible light beams of at least four colors, and scanning the document image using said image scanning unit.

11. The method according to claim 8, further comprising an arithmetic step of calculating composite wavelength component data by making predetermined arithmetic operations using as wavelength component data image data of respective colors obtained by scanning the document image by said image scanning unit.

12. A program stored on a computer readable storage medium for making a computer execute a control method of an image scanning device of claim 8.

* * * * *